United States Patent
Mankame et al.

(10) Patent No.: US 8,739,525 B2
(45) Date of Patent: Jun. 3, 2014

(54) THERMALLY-ACTIVE MATERIAL ASSEMBLIES INCLUDING PHASE CHANGE MATERIALS

(75) Inventors: Nilesh D. Mankame, Ann Arbor, MI (US); Jennifer P. Lawall, Waterford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 712 days.

(21) Appl. No.: 12/971,336

(22) Filed: Dec. 17, 2010

(65) Prior Publication Data
US 2011/0083431 A1    Apr. 14, 2011

Related U.S. Application Data

(63) Continuation-in-part of application No. 12/792,120, filed on Jun. 2, 2010, now Pat. No. 8,567,188, which is a continuation-in-part of application No. 12/437,768, filed on May 8, 2009, now Pat. No. 8,281,585.

(51) Int. Cl.
*F01B 29/10*     (2006.01)
*F02G 1/04*      (2006.01)

(52) U.S. Cl.
USPC .................................. 60/527; 60/528; 60/529

(58) Field of Classification Search
USPC .................................................. 60/527–529
See application file for complete search history.

(56) References Cited

U.S. PATENT DOCUMENTS

| | | | | |
|---|---|---|---|---|
| 3,064,477 A * | 11/1962 | Sergius | ............................ | 60/527 |
| 3,913,326 A * | 10/1975 | Banks | ............................ | 60/527 |
| 4,450,686 A * | 5/1984 | Banks | ............................ | 60/527 |
| 4,691,517 A * | 9/1987 | Banks | ............................ | 60/527 |
| 4,691,518 A * | 9/1987 | Banks | ............................ | 60/527 |
| 2005/0200067 A1 * | 9/2005 | Browne et al. | ............ | 269/289 R |

* cited by examiner

*Primary Examiner* — Christopher Jetton
(74) *Attorney, Agent, or Firm* — Parks IP Law LLC; Mickki D. Murray, Esq.

(57) ABSTRACT

A thermally-activated material assembly transformable between an actuated condition and a non-actuated condition including an actuator material that, in response to being heated and cooled above/below an actuation temperature, causes the actuator element to actuate from a non-actuated shape to an actuated shape, and vice versa, respectively. The assembly also includes a drive mechanism connected to the actuator element and a phase-change material (PCM) associated with the drive mechanism. The drive mechanism causes the PCM to either (i) directly engage the actuator element when the actuator assembly is in the non-actuated condition and to be disengaged from the actuator element when the actuator assembly is in the actuated condition or (ii) directly engage the actuator element when the actuator assembly is in the actuated condition and to be disengaged from the actuator element when the actuator assembly is in the non-actuated condition.

22 Claims, 8 Drawing Sheets

THERMALLY-ACTIVE MATERIAL ASSEMBLIES INCLUDING PHASE CHANGE MATERIALS

RELATED APPLICATIONS

This patent application claims priority to and continues-in-part from U.S. patent application Ser. No. 12/792,120, entitled, "ACCELERATING COOLING IN ACTIVE MATERIAL ACTUATORS USING HEAT SINKS," filed Jun. 2, 2010, and U.S. patent application Ser. No. 12/437,768, entitled "CONTROLLING HEAT TRANSFER IN ACTIVE MATERIAL ACTUATORS USING HEAT SINKS," filed on May 8, 2009, the disclosures of which are incorporated by reference herein.

TECHNICAL FIELD

The present disclosure relates generally to thermal management of thermally-activated active material assemblies and, more particularly, to thermal management of thermally activated active material assemblies using phase change materials.

BACKGROUND

I. Shape Memory Alloys

Shape-memory Alloy (SMA) is the generic name given to alloys that exhibit the unusual property of a strain memory, which can be induced either mechanically or thermally. This unusual property is characterized primarily by two thermo-mechanical responses known as the Shape-Memory Effect (SME) and Superleasticity.

Austenite, or the parent phase in an SMA, is stable at temperatures above a characteristic temperature referred to as the Austenite finish ($A_f$) temperature. At temperatures below a Martensite finish ($M_f$) temperature, the SMA exists in a lower-modulus phase known as Martensite. The unusual thermo-mechanical response of SMAs is attributed to reversible, solid-state, thermo-elastic transformations between the Austenite and Martensite phases.

Three other characteristic temperatures are commonly used to identify the state of an SMA material. When an SMA sample is cooled, Martensite starts nucleating at the Martensite start ($M_s$) temperature; when the sample is heated, the Martensite to Austenite transformation starts at the Austenite start ($A_s$) temperature. The SMA exhibits the SME most prominently at temperatures below $M_f$, and the material has to be above the $A_f$ temperature for superelastic behavior. At temperatures above $M_d$, the SMA loses its unique properties and behaves like an ordinary material. In many of the SMAs, these temperatures are related as follows: $M_f < M_s < A_s < A_f < M_d$.

II. Shape Memory Effect

An SMA material is typically processed thermo-mechanically at a temperature above $A_f$ to impart a desired form to it, such as by drawing the material into a wire. When the material is cooled to a temperature below $M_f$, it retains the original macroscopic form imparted to it, but its crystal structure changes as the material transforms from Austenite to Martensite.

On the application of a mechanical load to the SMA sample, the Martensitic material initially deforms elastically following Hooke's law. When the stress in the sample reaches a critical stress known as the first yield point of Martensite, the deformation occurs at a nearly constant stress via a shear-like mechanism known as de-twinning.

De-twinning is associated with a cooperative rearrangement of the atoms involving the sliding of atomic planes (twin interfaces) in the crystal structure of the SMA. Although the displacement of each atom is small, the overall deformation of the SMA can be significant (e.g., up to 8% strain vs. <1% strain for most metals) due to the accumulation of the coordinated motion of all or most of the atoms in the material. As the overall deformation is large, the SMA appears to be deforming plastically—hence this behavior is often described as pseudoplastic. However, unlike plastic deformation which occurs by the motion of dislocations and hence is irreversible, the deformation of martensitic SMA via the de-twinning mechanism does not involve dislocation motion or breaking of inter-atomic bonds. Therefore, the deformation is reversible. If the SMA is unloaded at this stage, the elastic component of the overall deformation is recovered completely, but the de-twinning deformation is retained.

Heating the material above the $A_s$ temperature induces a Martensite-to-Austenite transformation. The microstructure of the Martensite phase can include adjoining regions with multiple energetically-equivalent microstructures. In contrast, the austenite phase has only one microstructure, which is restored during the Martensite to austenite transformation. Therefore, this transformation causes the SMA material to recover the original form imparted to it during manufacture. In other words, the pseudoplastic strain is recovered completely by heating the deformed SMA above $A_f$. Cooling the material to below $M_f$ after the Martensite-to-Austenite transformation is complete, does not lead to any further change in form.

The phenomenon in which an SMA material recovers apparent plastic deformation, imparted at a low temperature, upon heating to a higher temperature is known as the Shape-Memory Effect.

If change of form (e.g., shape, dimension, etc.) associated with Martensite to Austenite transformation in a pseudo-plastically deformed SMA material, is resisted by an externally applied force/constraint, a considerable internal stress is developed to oppose the external force/constraint. The force can be used to drive an external load, thereby enabling the SMA material to be used as an actuator.

A. One-Way SME

In the foregoing description, SMA material that was subjected to pseudo-plastic deformations at a temperature below $M_f$ was able to recover the original form imparted to it by heating it above $A_f$. Subsequent cooling of the material to below $M_f$ did not induce any further change in form. In other words, there was a unique form associated with an unloaded SMA sample above $A_f$, but it could exist in many different forms at temperatures below $M_f$. Thus, the material exhibits a 'memory' only on heating, and hence, this phenomenon is known as the one-way shape-memory effect.

B. Two-Way SME (TWSME)

1. Intrinsic

Thermo-mechanical processing can impart an SMA the ability to exhibit an intrinsic two-way shape memory effect. Suitably processed SMA material can remember two shapes—one associated with temperatures above $A_f$ and the other with temperatures below $M_f$. Heating an unloaded sample of such a material above $A_f$ would cause the sample to attain its high temperature shape, while cooling it below $M_f$ would revert it back to its low-temperature shape.

2. Extrinsic

SMAs having one-way SME have been developed to a point where they have been used in a number of commercial applications. In contrast, materials that exhibit TWSME are still generally in developmental stages. In many practical applications the behavior of an element made from an SMA that exhibits intrinsic TWSME can be reproduced by a system comprising an element made from an SMA that exhibits one-way SME in mechanical opposition to another element known as the bias element. Such systems are said to exhibit extrinsic TWSME.

In these systems, one of the two elements dominates the other at temperatures below $M_f$, leading to one form (or equilibrium configuration) for the system. When the SMA is heated above its $A_f$, the stiffness of the SMA element increases, thereby changing the equilibrium configuration of the system to its high temperature form. Subsequent cooling of the SMA element causes the system to revert to its low-temperature form.

Challenges associated with thermal devices such as SMA actuators include reducing cycle time—the time required for the device to actuate and de-actuate, and protecting against thermal overload of the device. The present invention provides benefits in these and other areas for systems having thermal devices.

SUMMARY

The various embodiments of the present provide actuator element assemblies have phase change materials, and systems including and methods for using the same. In one aspect, the present disclosure relates to a thermally-activated material assembly transformable between an actuated condition and a non-actuated condition. The assembly of this aspect includes an actuator element having actuator material defined by an actuation temperature and a reset temperature. When the actuator material is supplied a stimulus in the form of heat that raises its temperature to or above its actuation temperature, the actuator element actuates from a non-actuated shape, wherein the actuator assembly is in the non-actuated condition, to an actuated shape transforming the actuator assembly to the actuated condition in response to being heated to the actuation temperature. Removal of the stimulus leads to cooling of the material; when the material cools to or below the reset temperature, and the actuator element de-actuates from the actuated shape back to the non-actuated shape. In some embodiments the assembly further includes a drive mechanism connected to the actuator element and a phase-change material (PCM) associated with the drive mechanism.

The PCM has a PCM material defined by a phase-change temperature and causing the PCM to transition from a first state to a second state in response to being heated to or above the phase-change temperature. The drive mechanism causes the PCM to directly engage the actuator element when the actuator assembly is in the non-actuated condition and to be disengaged from the actuator element when the actuator assembly is in the actuated condition.

In another aspect, the present disclosure also relates to a thermally-activated actuator assembly transformable between an actuated condition and a non-actuated condition. The assembly of this aspect includes an actuator element having actuator material defined by an actuation temperature and a reset temperature. The actuator material causes the actuator element to actuate from a non-actuated shape, wherein the actuator assembly is in the non-actuated condition, to an actuated shape transforming the actuator assembly to the actuated condition in response to being heated to the actuation temperature. The actuator material also causes the actuator element to actuate from the actuated shape back to the non-actuated shape in response to being cooled to the reset temperature. The assembly further includes a drive mechanism connected to the actuator element and a PCM associated with the drive mechanism. The drive mechanism causes the PCM to be placed in direct thermal contact with the SMA actuator element during one part (e.g., actuation) of the actuator cycle and be removed from direct thermal contact with the actuator element during the other part (e.g., de-actuation) of the actuator cycle.

The PCM has a PCM material defined by a phase-change temperature and causing the PCM to transition from a first state to a second state in response to being heated to or above the phase-change temperature. The phase transformation is accompanied by a significant absorption (e.g., melting of a solid) or release (e.g., freezing of a liquid) of heat at a nearly constant temperature or over a narrow range of temperatures. This ability to absorb (e.g., the latent heat of fusion) or release (e.g., the latent heat of fusion) large quantities of heat in comparison to the sensible heat absorbed or released when the material is not undergoing a change in phase (e.g., heating or cooling of a solid below its melting point) makes PCM materials attractive for thermal management applications. While solid-to-solid and liquid-to-gas phase transformations can also be used for large scale heat absorption, storage and release, most common PCMs use the solid-to-liquid phase change.

For ease of explanation, solid-to-liquid phase change is primarily described in the present application—e.g., terms used herein include solid phase, liquid phase, melting point, melting and freezing instead of pre-transformation phase, post-transformation phase, phase transformation temperature, forward transformation and reverse transformation respectively. It should be understood, however, that this choice of terminology is not intended to exclude the other types of PCMs.

Generally, the PCM element may take the form of a simple coating of a PCM surrounding the SMA actuator element, or it may take the form of a sheath made of a PCM that is slipped over an SMA actuator, or it may take the form of a thermal composite comprising PCM and non-PCM constituents, or it may take the form of a PCM-containing solid enclosure. The thermal composite may have the non-PCM material distributed within a PCM matrix (e.g., copper mesh in a paraffin thermal composite to improve the thermal diffusivity of the PCM thermal composite) or have the PCM material encapsulated in a non-PCM matrix (e.g., PCM micro-beads dispersed in a thermally conductive silicone matrix).

In a further aspect, the present disclosure relates also to a thermally-activated actuator assembly transformable between an actuated condition and a non-actuated condition. The assembly includes an actuator element having actuator material defined by an actuation temperature and a reset temperature. The actuator material, when exposed to thermal stimulus, causes the actuator element to actuate from a non-actuated shape, wherein the actuator assembly is in the non-actuated condition, to an actuated shape transforming the actuator assembly to the actuated condition in response to being heated to the actuation temperature.

The actuator material also, when exposed to thermal stimulus, causes the actuator element to go from the actuated shape back to the non-actuated shape in response to being cooled to the reset temperature. In one particular embodiment of the present disclosure, the assembly includes a thermal composite. The thermal composite includes a PCM material defined by a phase-change temperature and causing the PCM to transition from a first state to a second state in response to being heated to the phase-change temperature. The thermal composite also includes a non-PCM material distributed with the PCM material, the non-PCM material having a higher conductivity than the PCM material, thereby promoting transfer of heat introduced to a proximal region of the PCM to a distal region of the PCM.

Other aspects of the present invention will be in part apparent and in part pointed out hereinafter.

DETAILED DESCRIPTION

Figure 1:
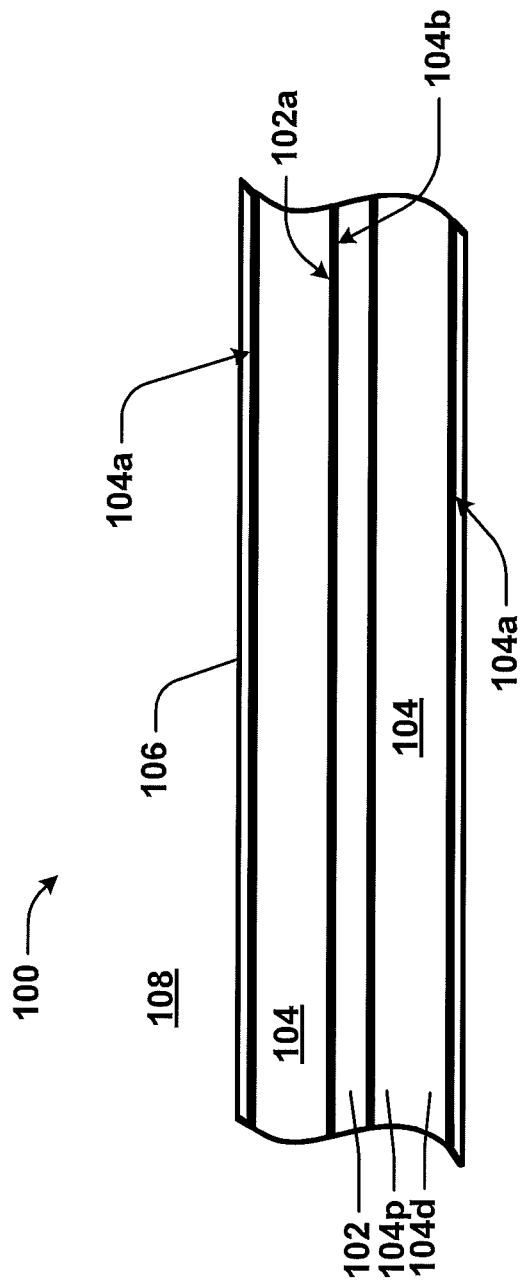
FIG. 1 illustrates a cross section of an actuator assembly including a phase change material element, according to an embodiment of the present disclosure.

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

I. OVERVIEW OF THE DISCLOSURE

In various embodiments, the present disclosure describes assemblies having a thermal-sensitive element, such as a shape memory alloy (SMA) actuator element, and a phase change material (PCM) element for thermal management of the thermal-sensitive element. Although the embodiments are described generally in connection with SMA actuators, the teachings of the present disclosure may be implemented with assemblies having other thermally-activated active materials.

In various embodiments described herein, the PCM element is arranged in the assembly to be in permanent or intermittent thermal contact with the SMA actuator element. The PCM element affects performance of the SMA actuator by reducing actuation time of the actuator, reducing de-actuation time of the actuator, and/or providing protection against thermal overload of the thermally-active element.

II. THERMAL-SENSITIVE ELEMENT

As exemplary thermal-sensitive elements, shape memory alloys (SMAs) and shape memory polymers (SMPs) are primarily described.

A. Shape Memory Alloys

SMAs are alloys that demonstrate an ability to return to a previously defined shape and/or size when subjected to an appropriate thermal stimulus. Typically, SMAs are used to perform useful mechanical work. For example, an SMA may be coupled to a load, such as a switch or a mass to be moved, and to an initiating source operable to deliver an activation signal to the SMA. The activation signal may be, for example, a thermal input, a mechanical input, or a combination, thermo-mechanical input.

Actuator assemblies of the present disclosure may be used in a variety of contexts. For example, actuator assemblies may be used in automotive applications, such as fuel injectors or passenger-compartment features (e.g., seat lumbar support control).

The activating heat source may be a heat source external to the actuator assembly, such as an automobile exhaust system, heating/cooling system, or engine. The heat from the external source could be otherwise unused excess or by-product heat. Recovering such excess heat is an efficient way to generate SMA work because the activating heat does not need to be separately generated and the used excess heat is not wasted. Also, excess heat could be retrieved from the source in such a way that the source is advantageously cooled in the process.

In some embodiments, the initiating source could also be an electric power supply, alternating or direct-current, and thermal energy generated by passing the current through a resistance. This type of heating is known as Joule heating. The electric supply may be, for example, a charging system of a vehicle in which the SMA is used. A controller (e.g., a computer controller) may be coupled to the heat or electrical source and the SMA to control actuation of the SMA and/or timing of engagement between the SMA and the PCM.

SMAs are capable of undergoing phase transitions in which their stiffness, dimension and/or shape are altered as a function of temperature. Generally, in the low temperature, or Martensite phase, SMAs can be pseudo-plastically deformed and upon exposure to some higher temperature will transform to an Austenite phase, or parent phase, returning to their permanent shape. The Austenite phase shape may be set during the manufacturing of the SMA element. Materials that exhibit this shape memory effect only upon heating are referred to as having one-way shape memory. Materials that also exhibit shape memory upon re-cooling are referred to as having two-way shape memory behavior, as described further below.

SMAs exist in several different temperature-dependent phases. The most commonly utilized of these phases are the so-called Martensite and Austenite phases mentioned above. In the following discussion, the Martensite phase generally refers to the more deformable, lower temperature phase whereas the Austenite phase generally refers to the stiffer, higher temperature phase. When the SMA is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the SMA is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). In view of the foregoing, a suitable activation signal for use with SMAs is a thermal activation signal having a magnitude to cause transformations between the Martensite and Austenite phases.

SMAs can exhibit a one-way shape memory effect, an intrinsic two-way effect, or an extrinsic two-way shape memory effect depending on the alloy composition and processing history. Annealed SMAs typically only exhibit the one-way shape memory effect. Sufficient heating subsequent to low-temperature deformation of the shape memory material will induce the Martensite to Austenite type transition, and the material will recover the original, annealed shape or the permanent shape. Hence, one-way shape memory effects are only observed upon heating. Active materials comprising SMA compositions that exhibit one-way memory effects do not automatically revert to their temporary shape or deformed shape on cooling, and will likely require an external mechanical force to revert to their temporary shape.

Intrinsic and extrinsic two-way shape memory materials are characterized by a shape transition both upon heating from the Martensite phase to the Austenite phase, as well as an additional shape transition upon cooling from the Austenite phase back to the Martensite phase. Intrinsic two-way shape memory behavior must be induced in the shape memory material through thermo-mechanical processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a SMA composition that exhibits a one-way effect with another element that provides a restoring force to recover the original shape of the composite.

The temperature at which the SMA recovers its permanent shape when heated can be adjusted by slight changes in the composition of the alloy and through heat treatment. In nickel-titanium SMAs, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the SMA vary greatly over the temperature range spanning their transformation, typically providing the system with shape memory effects, super-elastic effects, and high damping capacity.

Suitable SMA materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, copper-titanium-nickel, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in dimension, elastic modulus, damping capacity, and the like.

In typical use, SMAs exhibit a modulus increase of about 2.5 times and a dimensional change (recovery of pseudo-plastic deformation induced when in the Martensitic phase) of up to about 8% (depending on the amount of pre-strain) when heated above their Martensite to Austenite phase transition temperature. One exemplary commercially available SMA is Flexinol® (Flexinol is a registered trademark of Dynalloy, Inc., of Tustin, Calif.).

B. Shape Memory Polymers

Thermally-activated shape memory polymers (SMPs) are polymers that exhibit all of the following properties:
1. Their elastic modulus changes substantially (usually by between about one to about three orders of magnitude) across a narrow transition temperature range;
2. This temperature range can be adjusted to lie within a wide range that includes the interval of about 0 to about 150° C. by varying the composition of the polymer; and
3. There is a finite rubbery plateau in the material's elastic response at temperatures above the transition range where the modulus remains fairly constant.

SMPs, in addition to the elastic modulus, properties such as permeability to moisture, refractive index, etc., also exhibit a significant change across the transition temperature range. SMPs activated by other stimuli such as light, humidity, etc., show a similar behavior wherein the change in properties occurs over a range of, or corresponding to, finitely separate discrete values of the specific stimulus.

These properties are the result of morphology of the polymer which contains chains of atoms that are connected by two types of cross-links: irreversible and reversible. The latter type can be broken by supplying sufficient thermal energy to raise the temperature of the polymer above the transition range in thermally-activated SMPs. In this condition, the chains in the polymer are held together only by the irreversible cross-links. Hence, the elastic modulus of the polymer is low and the material can be stretched to high strains (e.g., up to about 300%).

Due to the fewer cross-links the polymer chains can move relative to each other by significant distances to accommodate the large strains without causing breakage of the reversible cross-links, and hence, without plastic failure. If this deformation is maintained while the polymer is cooled to a temperature below the transition range, the reversible cross-links are formed between the polymer chains in their new positions. The increased density of cross-links constrains the relative motions of the polymer chains and, thus, increases the stiffness of the material. The newly formed reversible cross-links serve to lock in the deformation imparted to the polymer above the transition range. Experiments have shown that the polymer can retain the deformed shape for extended periods of time (e.g., up to about 6 months) as long as they are loaded within the elastic limit of the polymer below the transition range and the material temperature does not rise into or above the transition range. Subsequent heating of the polymer above the transition range causes the reversible cross-links to break, and if the material is free of external loads, it recovers the deformation induced in it earlier above the transition range. Strain recovery is nearly complete—e.g., about 98% or more in many cases. Thus, SMPs can be imparted temporary shapes by deforming them above the transition range and cooling them below the transition range. The original shape can be recovered simply by heating the polymer above the transition range in the absence of external loads.

Depending on the nature of the polymer morphology a wide variety of SMPs can be formed. One way of classifying SMPs is based on the nature of the cross-links. The irreversible cross-links in Thermoset SMPs are formed by covalent bonds. Thermoplastic SMPs do not have truly irreversible cross-links. Instead, they have two or more types of reversible cross-links that are formed and broken over finitely separated temperature ranges. Any of these temperature ranges across which the polymer behaves in a manner specified above can be treated as a transition range for the material. Typically, the lowest temperature range that falls within the range of normal operating conditions for the material is used as the transition range. When the material is heated above its transition range, only the cross-links corresponding to this range and all lower ranges are broken. The cross-links that break and form at higher temperatures are unaffected, and they play the role of irreversible cross-links in this class of SMPs.

The above-mentioned changes in properties occur when the temperature of the polymer crosses a characteristic switching temperature. When the reversible cross-links are attributed to the formation of a glassy state (i.e., vitrification), the characteristic switching temperature is the glass transition temperature for this state. When the reversible cross-links are formed due to the formation of micro-crystalline regions, the characteristic switching temperature is the melting point for this state.

An SMP can exhibit multiple switching temperatures corresponding to the formation or dissolution of different phases. Usually, the highest switching temperature corresponds to the temperature above which the permanent shape of the SMP is set. Any of the other remaining (i.e., lower) switching temperatures can be chosen for a particular application based on the specific needs of that application.

A temporary shape can be set by heating the material to a temperature that is higher than the chosen switching temperature of the polymeric material, but lower than the next higher switching temperature of the material. The temporary shape is set while deforming the material into this shape at or above this temperature followed by cooling it to below the chosen switching temperature while maintaining the shape to fix the shape. The material can be reverted back to the permanent shape by heating the material above the chosen switching temperature. In some embodiments, it is important to ensure that no external loads act on the material while it is being reverted back to the permanent shape.

For example, the permanent shape of the polymeric material may be a wire presenting a substantially straightened shape and defining a first length, while the temporary shape may be a similar wire defining a second length less than the first. In another embodiment, the material may present a spring having a first modulus of elasticity when activated and second modulus when deactivated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable SMPs include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, poly-ortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

While SMP could be used variously in block, sheet, slab, lattice, truss, fiber or foam forms, they require continuous power to remain in their lower modulus state.

III. PHASE CHANGE MATERIALS

Phase Change Materials (PCMs) can be used for latent heat storage and release. PCMs have relatively high enthalpy of transformation associated with a change of phase (e.g., latent heats of fusion associated with a change of phase from solid to liquid), and are capable of storing and releasing relatively large amounts of energy. Heat is absorbed or released as the material changes its phase, such as from solid to liquid, liquid to solid, liquid to gas, gas to liquid, and solid to solid. The most commonly used phase change is solid to liquid. Generally, liquid-gas phase changes occur relatively fast and involve a relatively high enthalpy of transformation, and solid-solid phase changes occur relatively slowly and involve a relatively low enthalpy of transformation.

When heating a solid-to-liquid PCM, for example, the PCM initially behaves like a sensible heat storage (SHS) material, with its temperature rising as it absorbs heat. Unlike SHS materials, however, when solid-liquid PCMs reach the temperature at which they change phase, they absorb large amounts of heat while maintaining a nominally constant temperature. The solid-liquid PCM will continue to absorb heat without a significant rise in temperature until all the material is transformed to the liquid phase. Other types of PCMs exhibit similar attributes.

When the temperature of a PCM in its liquid phase is reduced to below the phase-change temperature, the PCM releases its stored latent heat and eventually solidifies if the adjacent temperature is below its melting point.

It is estimated that PCMs store between about five and about fourteen times more heat per unit volume than some heat absorbing materials, such as water, masonry, or rock.

PCMs are available with any of a wide variety of phase-change temperatures. For example, PCMs having phase-change temperatures between about −5° C. and about 190° C. are available.

PCMs types include organic PCMs and inorganic PCMs. Organic PCMs include, for example, paraffin ($C_nH_{2n+2}$), such as octadecane, and fatty acids ($CH_3(CH_2)_{2n}COOH$). Inorganic PCMs include, for example, salt hydrates ($M_nH_2O$). Another type of PCM is eutectics, which are a combination of various organic materials, or organic and inorganic materials.

Variables for selecting a PCM include thermal characteristics (e.g., heat of fusion per unit volume, specific heat, thermal conductivity/volumetric heat storage rate, heat release rate), kinematic properties (e.g., change of volume, congruency of phase change, congruency of melting, and nucleation (self-nucleating versus nucleating agent needed)), chemical properties (e.g., stability, amount of segregation, full reversibility between phase changes, degradation after a large number of phase-change cycles, and corrosiveness), and economic factors (e.g., cost and availability).

IV. PHASE CHANGE MATERIAL COATING

Turning now to the figures, and more particularly to FIG. 1, an exemplary thermal-sensitive assembly 100 using phase change materials (PCMB) is described. The assembly 100 includes a thermal-sensitive element 102 and a PCM 104 having a defining phase-change temperature. The PCM 104 coats, surrounds, and/or encapsulates the thermal-sensitive element 102. The assembly 100 is arranged so that the PCM 104 is in thermal contact with the thermal-sensitive element 102 for all or part of the actuation/de-activation cycle of the thermal-sensitive element 102. Although the teachings of the present disclosure may be used to improve performance of other thermal-sensitive elements 102, the thermal-sensitive element is described primarily as a thermal-sensitive actuator, by way of example, and more particularly as an SMA actuator element.

Common shapes for SMA actuators elements 102 include wires, cantilever beams, springs, ribbon, strip, sheet, tubing, cables, ropes, and braids. The SMA actuator element 102 can include one or multiple components. For instance, in some embodiments (not shown in detail), the SMA actuator element 102 includes a single wire or a bundle of wires, such as in parallel or braid. Components of such multi-component SMA actuator elements may have the same or different characteristics, such as size, shape, and material.

The PCM 104 is shaped, sized, and arranged with respect to the SMA actuator element 102 to reduce actuation time of the SMA actuator element 102, reduce de-actuation time of the SMA actuator element 102, and/or protect against overheating of the actuator assembly 100, in general, or SMA actuator element 102, in particular, as described in more detail below.

The PCM 104 includes a first surface 104b sized, shaped, and arranged in the assembly 100 to contact a surface 102a of the SMA actuator element 102. In various embodiments, the PCM 104 is sized, shaped, and arranged to engage the surface 102a of the SMA actuator element 102 permanently or intermittently. The contact may be referred to as a thermal coupling between the two elements 102, 104. In the embodiment illustrated in FIG. 1, a second surface 104a of the PCM 104 is exposed to an ambient environment 108 (e.g., air).

The PCM component 104, which may take the form of a coating, a sheath, a cylinder, etc., changes phase when its temperature reaches its phase-change temperature. While solid-to-solid and liquid-to-gas phase transformations can also be used as PCMs capable of heat storage/release, most common PCM applications use the solid-to-liquid phase change. As such, for ease of explanation, the terminology for the solid-to-liquid PCMs used herein includes solid phase, liquid phase, melting point, melting and freezing instead of pre-transformation phase, post-transformation phase, phase transformation temperature, forward transformation, and reverse transformation, respectively. However, it should be understood that the present disclosure applies to the other types of PCMs.

The PCM 104 can be selected and/or composition of PCM material tailored to achieve desired characteristics. For example, the PCM 104 can be selected to have a phase-change temperature of choice. Variables for selecting a phase-change temperature include the actuation temperature of the heat-sensitive SMA actuator element 102. For instance, the melting or vaporization temperature of the PCM 104 may be represented as a percentage of the phase-change temperature of the SMA actuator element 102. In one embodiment, the PCM 104 and SMA actuator element 102 are selected so that the PCM 104 has a phase-change temperature between about 110% and about 125% of the activation temperature of the SMA actuator element 102.

As described in more detail below, the PCM 104 may be selected or fashioned to have a phase-change temperature below, at, or above the actuation temperature, to promote corresponding beneficial heat-transfer characteristics between the PCM 104 and the SMA actuator element 102. For instance, the PCM 104 draws heat from or releases heat to the SMA actuator element 102 depending on the relative temperatures of the PCM and SMA actuator element during and between actuation cycles.

The rates at which the PCM 104 draws and releases heat depends at least in part on the enthalpy of fusion of the PCM 104, also known as the latent heat of fusion, latent heat of fusion, or enthalpy change of fusion, which is commonly symbolized as $\Delta H_{fus}$. The standard (or molar) enthalpy of fusion for a material is the amount of thermal energy absorbed or evolved for one mole of the material to change states, such as from solid to liquid or vice versa. In one embodiment, the PCM 104 has an enthalpy of fusion of between about 100 Joules/gram (J/g) and about 300 J/g, such as is the case with at least some paraffin waxes, though PCMB of a wide variety of other enthalpy of fusions may be used in the assemblies and methods of the present disclosure.

As also described further below, PCMB 104 are in some embodiments used as compact heat storage elements for pre-heating the SMA actuator element 102 to reduce actuation times for the SMA actuator element 102 and/or reducing environmental dependence of the actuation times. In some particular embodiment, the SMA actuator element is pre-heated by way of the PCM 104, which is in turn heated by an external source such as a feed of by-product or excess heat from a system external to the actuator assembly 100, such as an engine or heating/cooling system of an automobile in which the actuator assembly 100 is used.

In some embodiments, the PCM 104 is at least partially surrounded by a sheath 106, as shown in FIG. 1. The PCM sheath 106 holds the PCM 104 when the PCM 104 is in a partially or fully molten state. The sheath 106 material may be selected to have a heat transfer rate greater than that of the PCM 104, and in some particular embodiments, greater than between about 150% and about 200% of a thermal conductivity of the PCM 104, so as to facilitate removal of heat energy form the PCM 104 while containing the PCM 104. The sheath 106 may include any of a variety of materials and combinations of materials. In some embodiments, the sheath 106 is formed of copper (e.g., copper alloys) or aluminum (e.g., aluminum alloys), which present thermal conductivities of approximately 400 Watts per Kelvin per meter (W/mK) and 250 W/mK, respectively. In some embodiments, the sheath 106 has a thermal conductivity that is lower than that of the PCM 104, and so exhibits insulative properties by keeping heat from leaving the PCM through the corresponding interface.

The sheath 106 may be sized, shaped, and arranged with respect to the PCM 104 to pass heat between the PCM 104 and the ambient environment 108 during operation of the assembly 100 in a desired manner. The sheath 106 may have a variety of sizes and shapes. In some embodiments, the sheath 106 has a shape corresponding to a shape of the SMA actuator element 102. In some embodiments, the sheath 106 is stretchable to accommodate expansion and contraction of the PCM 104 through operational cycles of the assembly 100.

In the embodiment illustrated in FIG. 1, the PCM 104 is sized, shaped, and otherwise configured so that a portion 104d of the PCM 104 being more distal to the SMA actuator element 102 act effectively as a sheath, holding more proximal portions 104p of the PCM 104. In this embodiment, any melted or vaporized PCM is encapsulated by the distal portion 104d, as long as the distal portion 104d is not melted. In some embodiments, the assembly 100 is configured so that the proximal regions 104p of the PCM 104 at ends (not shown in detail) of the PCM 104 have not melted fully, so that molten PCM does not drain out of the ends. In some particular embodiments, one or more ends of the PCM 104 are thermally grounded, which keeps the end portions of the PCM 104 (e.g., proximal and distal) at a lower temperate while temperature of the non-end proximal portion of the PCM 104 is increasing, and thus keeps them from becoming molten. In one particular embodiment, one or more ends of the PCM 104 are fitted with end caps (not shown) to avoid leakage from the molten PCM core.

The assembly 100 may be configured so that the SMA actuator element 102 will fully actuate before the more distal portion 104d of the PCM changes to the liquid or gas phase.

To maximize energy transfer between the PCM 104 and SMA actuator element 102, surface-to-surface contact between the two elements should be maximized. In one embodiment, the assembly 100 is formed by drawing the SMA actuator element 102 through the PCM while the PCM is in a full or at least partial liquid phase. In another embodiment, the assembly 100 is formed by molding or shrink-wrapping the PCM 104 around the SMA actuator element 102.

In one contemplated embodiment, an intermediate material (not shown) is introduced between the PCM 104 and SMA actuator element 102 during formation of the assembly and/or during operation. For example, in one embodiment, a heat transfer interface such as a thermal grease may be introduced between the two.

In one aspect of the disclosure (not shown), the assembly 100 or system including the assembly 100 is configured so that a fluid (e.g., air, another gas, or a liquid) continuously or selectively engages the exterior surface 104a of the PCM 104. In some embodiments, the fluid is thermally coupled to a source operable to heat and/or cool the fluid, and thereby the PCM 104 toward a target temperature. That is, when the PCM 104 is heated, the SMA actuator element 102 is heated by the warmer PCM 104.

The PCM 104 may be used to pre-heat the SMA actuator element 102 in order to decrease the actuation time of the element 102. For example, before the actuator is heated by the initiating source (not shown), the PCM 104, and so the SMA actuator element 102, can be heated to a temperature greater than the ambient temperature and below the reset temperature of the SMA actuator 102. In this example, the temperature of the SMA actuator element 102 would then only need to be increased from the temperature of the fluid to the actuating temperature. This process of reducing the actuation period may be referred to as pre-heating, or priming the SMA actuator element 102, and is described in further detail with respect to the various implementation cases below.

Conversely, the fluid can cool the PCM 104, and thereby cool the SMA actuator element. For example, after the SMA actuator element 102 is actuated, the relatively cooler PCM 104 could help bring the temperature of the SMA actuator element 102 down below its actuation temperature.

In one embodiment (not shown), a PCM is disposed in an interior region of the SMA actuator element 102, and in one embodiment a PCM is disposed within the SMA actuator element and around the SMA actuator element 102. In either of these embodiments, the heating and/or cooling fluids described above may be put into continuous or selective contact with the internal and external PCMs.

V. PCM THERMAL COMPOSITE

The PCM used in connection with the SMA actuator element 102 may be a part of a thermal composite. Thermal composites are combinations of a PCM and a non-PCM, usually a solid, structure. In one example, the PCM includes a copper or silicon mesh, as the solid structure, immersed in a paraffin-wax, as the PCM. Such composites, or hybrid materials, are created to have specific material properties. One characteristic of pure PCM 104 and PCM thermal-composite is thermal conductivity. Whatever the PCM material, thermal conductivity is increased by adding a highly-conductive non-PCM. For embodiments in which the PCM is expected to flow in the molten state, the non-PCM must be porous, such as in the form of a mesh, to allow the flow.

Figure 2:
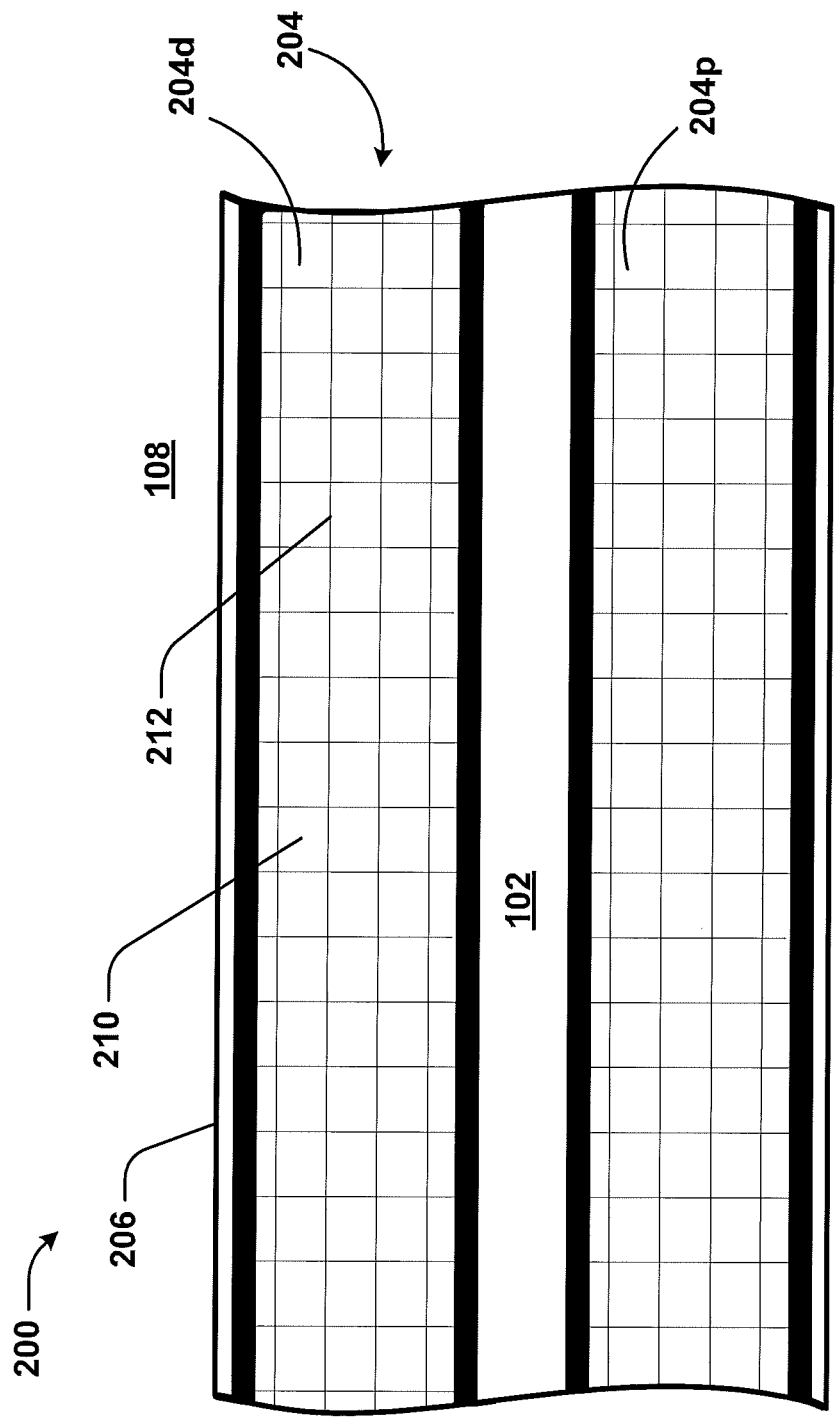
FIG. 2 illustrates a cross section of an actuator assembly including a thermal composite comprising a phase change material, according to another embodiment of the present disclosure.

FIG. 2 shows an actuator assembly 200 including an SMA actuator element 102 and a PCM thermal composite 204. The PCM thermal composite 204 includes a PCM 210 dispersed or infused within or about a non-PCM 212. In some embodiments, the non-PCM 212 forms a framework, such as a three-dimensional matrix or lattice, throughout which the PCM 210 is distributed.

The non-PCM 212 may have any of a variety of shapes and sizes. For example, in one embodiment, the non-PCM 212 is formed of inter-connected boxes providing rectangular (e.g., square) cross sections. In one contemplated embodiment, some or all components (e.g., edges or sides) of the non-PCM 212 are curved.

In one embodiment (not shown), the PCM thermal composite 204 includes beads of non-PCM distributed throughout a PCM. In one contemplated embodiment (also not shown), the thermal composite 204 includes PCM beads distributed throughout a non-PCM. The beads of these embodiments may have any of a variety of shapes, including spherical, cubicle, and elongate.

The non-PCM 212 of each of these embodiments facilitates distribution of heat energy from the SMA actuator element 102 to the more distal region 204d of the PCM thermal composite 204 to increase absorption of heat from the SMA actuator element 102. This is especially useful when the PCM has poor thermal diffusivity. As the SMA actuator element 102 is first heated, during operation of the assembly 200, the more proximal region 204p of the PCM thermal composite 204, being in contact with or closer to the SMA actuator element 102, absorbs heat energy before the distal regions 204d, and so the proximal regions 204p would heat up first, and change phase first. The more uniform distribution of heat facilitated by the non-PCM part improves the heat storage/release performance of the thermal composite.

The non-PCM 212, in addition to holding the PCM 104, may function to give integrity to the thermal composite 204. The integrity can aid in working of the thermal composite 204, such as by facilitating cutting, combining, and otherwise working.

The materials for forming the thermal composite 204 may be selected based on a variety of characteristics without departing from the scope of the present invention. Exemplary characteristics include conductivity, availability, cost, and ability to be cut or worked in other ways. As provided above, an exemplary non-PCM 214 is copper and paraffin is an exemplary PCM. Paraffin is beneficial as a PCM because it has a relatively high phase-change temperature—around 40-50° C., depending on a grade of paraffin, but a relatively low thermal conductivity. Using paraffin alone can result in a less than desired level of efficiency, but adding a relatively conductive non-PCM improves transfer of energy, making heat transfer occur more quickly and more evenly throughout the PCM thermal composite 204.

In some embodiments, the assembly 200 includes a sheath 206, which may have the same or similar characteristics as the sheath 106 described above in connection with the assembly 100 illustrated in FIG. 1. In some embodiments (not shown), the assembly 200 does not include the sheath 206.

The SMA actuator element 102 presents a bandwidth defined by a cycle that includes heating, actuation, cooling, and de-actuation periods. The PCM 104 and PCM thermal composite 204 are operable in various embodiments to reduce the cooling period and/or the actuation period, and/or may protect the SMA actuator element 102 against thermal damage.

VI. MOVING PCM MASS

Figure 3A:
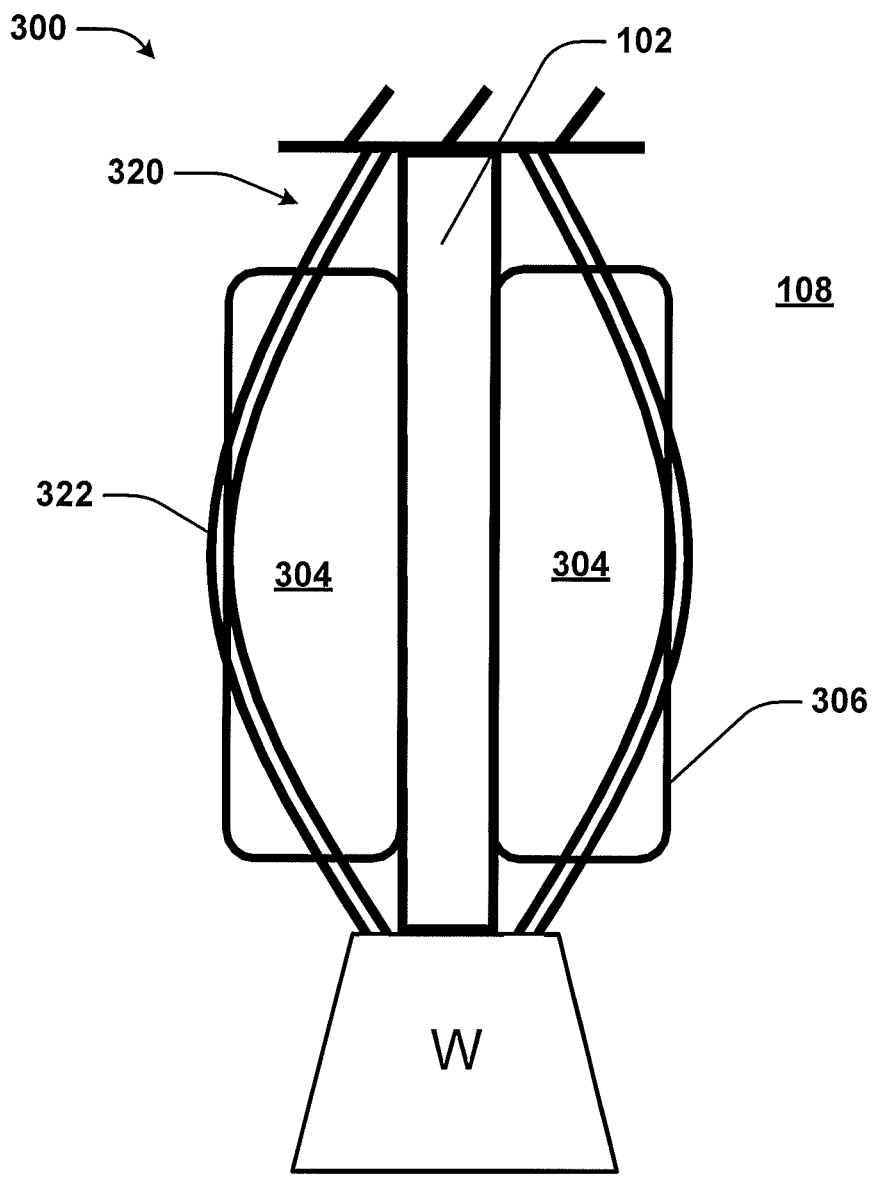
FIG. 3A illustrates a cross section of an actuator assembly including moving masses enclosing or comprising phase change material, prior to actuation, according to an embodiment of the present disclosure.

FIG. 3A shows an assembly 300 having an SMA actuator element 102 and one or more PCM moving masses 304, or PCM reservoirs. The PCM 304 of this embodiment may have the characteristics of the PCMs 104, 204 described above regarding FIGS. 1 and 2. For example, in some embodiments, the PCM 304 is a thermal composite, and in some embodiments is at least partially covered by a sheath 306. In the embodiments having a sheath 306, the sheath 306 may have the same or similar characteristics as the sheath 106 described above in connection with the assembly 100 illustrated in FIG. 1.

The moving masses 304 are, in some embodiments of the present disclosure, primarily or entirely made of PCMs, such as solid-to-solid PCMs. In some embodiments, the moving masses include PCMs, such as a solid-to-liquid PCM or a liquid-to-gas PCM, within a solid enclosure 306 (e.g., copper jacket), such as a paraffin wax in the copper jacket.

The assembly 300 is configured such that the PCM 304 and SMA actuator element 102 autonomously and selectively engage and disengage with each other as the assembly 300 cycles between non-actuated and actuated states. For this, in some embodiments the assembly 300 further includes a drive mechanism 320. The drive mechanism 320 is associated with (e.g., connected to) the PCM 304 and operable to cause displacement of the PCM 304 to a point of contact with the SMA actuator element 102. The drive mechanism 320 is preferably configured to cause such contact without applying excessive stress loads to the SMA actuator element 102. It is contemplated that the PCM 304 may be connected to the drive mechanism 320 or integral to the drive mechanism 320, such as by being formed within or otherwise as part of, such as between the double lines of the drive mechanism 320 shown in FIG. 3.

In one embodiment, the drive mechanism 320 includes one or more bowed structures 322, such as bowed springs, or other types of springs. In one particular embodiment, the drive mechanism 320 is configured and arranged in the assembly 300 to be driven by the SMA actuator element 102, itself. Namely, when the SMA actuator element 102 moves, in actuating and de-actuating to do work (e.g., move a switch or other weight W, close/open a valve, press/depress a button, etc.), the mechanism 300 is moved in a corresponding fashion due to its connection to the actuator element 102.

Figure 3B:
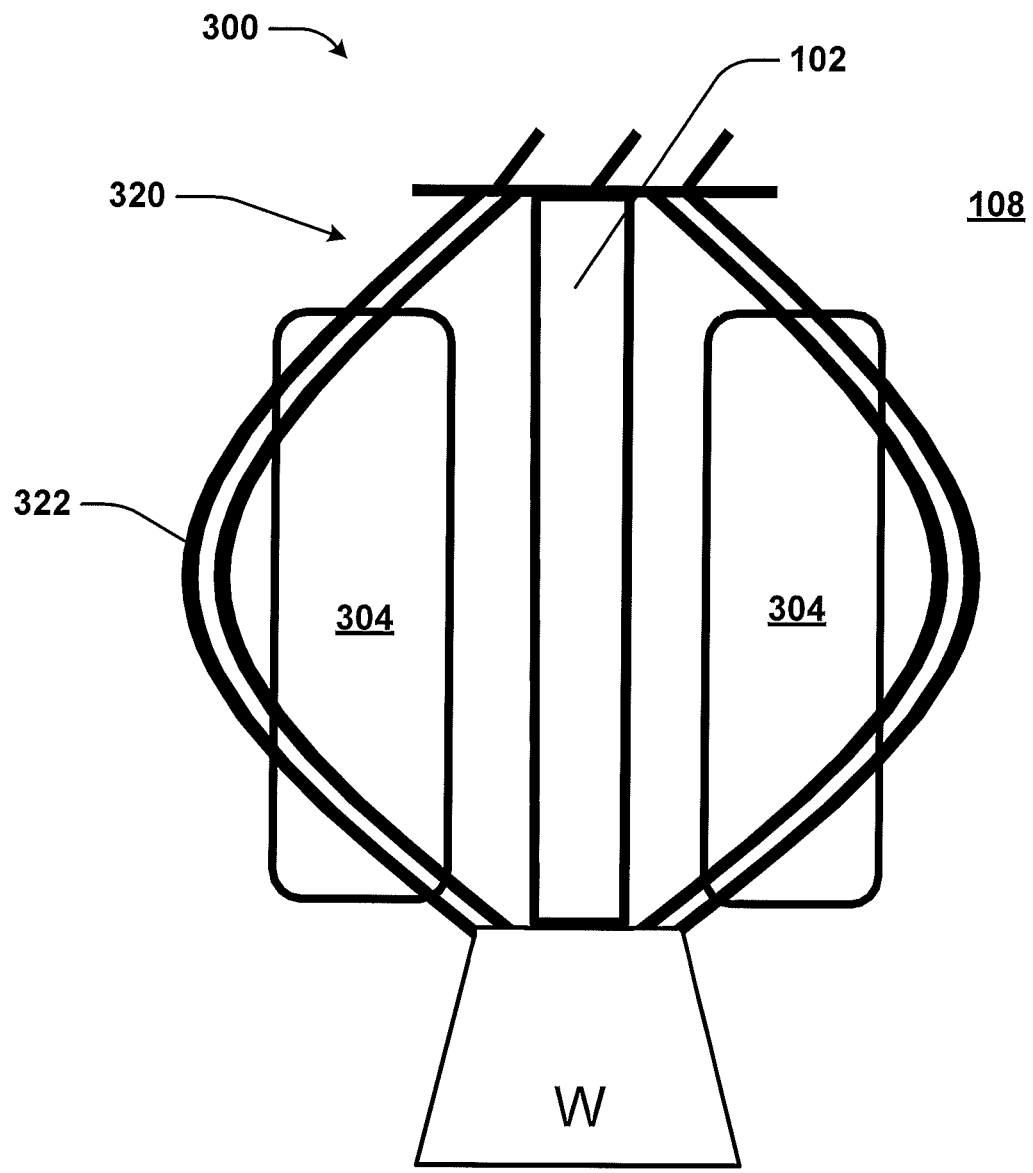
FIG. 3B illustrates the cross section of the actuator assembly of FIG. 3A, after actuation.

For instance, when the SMA actuator element 102 is actuated from its non-actuated state, shown in FIG. 3A, to its actuated state shown in FIG. 3B, the drive mechanism 320 is moved from an initial position shown in FIG. 3A to a resulting position shown in FIG. 3B.

As shown in FIGS. 3A and 3B, the drive mechanism 320 is configured and arranged in the actuator assembly 300 so that the PCM 304 is moved away from engagement with the SMA actuator element 102 as the actuator element 102 is actuated. This embodiment is used to provide beneficial thermal transfer between the SMA actuator element 102 and the PCM 304 before and/or at the point of actuation. For instance, as described further in the first case examples below, the arrangement of this assembly 300 could be used to pre-heat the SMA actuator element before actuation.

The PCM 304 is caused to be at a temperature that is higher than the temperature of the ambient environment 108. When the PCM 304 contacts the SMA actuator element 102, energy is transferred from the PCM 304 to the actuator element 102, and the actuator element 102 as a result. The PCM 304 may be heated in a variety of ways, including from the actuation heat of the SMA actuator element 102 and/or from an external heat source. As described above, the external heat source can be a dedicated source or a trickle current of fluid having by-product heat from another system, such as an engine or cooling system of an automobile in which the actuator assembly 300 is used.

The SMA actuator element 102, being heated to the elevated temperature above the ambient temperature, would then only need to be heated from the elevated temperature to the actuation temperature, instead of from the lower ambient temperature to the actuation temperature. Upon actuation, the PCM 304 are moved away from contact with the SMA actuator element 102, as shown in FIG. 3B, thereby better allowing the actuator element 102 to cool and not increasing the de-actuation time.

When cooled, and returned to its non-actuated state, the SMA actuator element 102 is ready for its next actuation, and the drive mechanism 320 causes the PCM 304 to re-engage the SMA actuator element 102. In some embodiments, the assembly 300 is arranged so that, in the non-actuated state shown in FIG. 3A, the PCM 304 is pressed into contact with the SMA actuator element 102 to maximize a contact area between the two for maximum heat transfer. For example, the drive mechanism 320, the PCM 304, and the actuator element 102 may be arranged so that when the actuator element 102 is in its non-actuated state, the drive mechanism 320 exerts a bias force causing the PCM 304 to not just contact the actuator element 102, but press against it.

In some embodiments, the drive mechanism 320 provides a biasing force toward one or both of the non-actuated position shown in FIG. 3A and the actuated position shown in FIG. 3B. In this way, the drive mechanism 320 assists the SMA actuator element 102 in transitioning from its actuated state to non-actuated state or from the non-actuated state to the actuated state, respectively. In this way the drive mechanism 320 can limit the amount of force that the actuator element 102 needs to generate to actuate or de-actuate. Other benefits can include longer life of the actuator element, increased load-moving ability of the assembly 300, and faster actuation and/or de-actuation times.

Figure 4A:
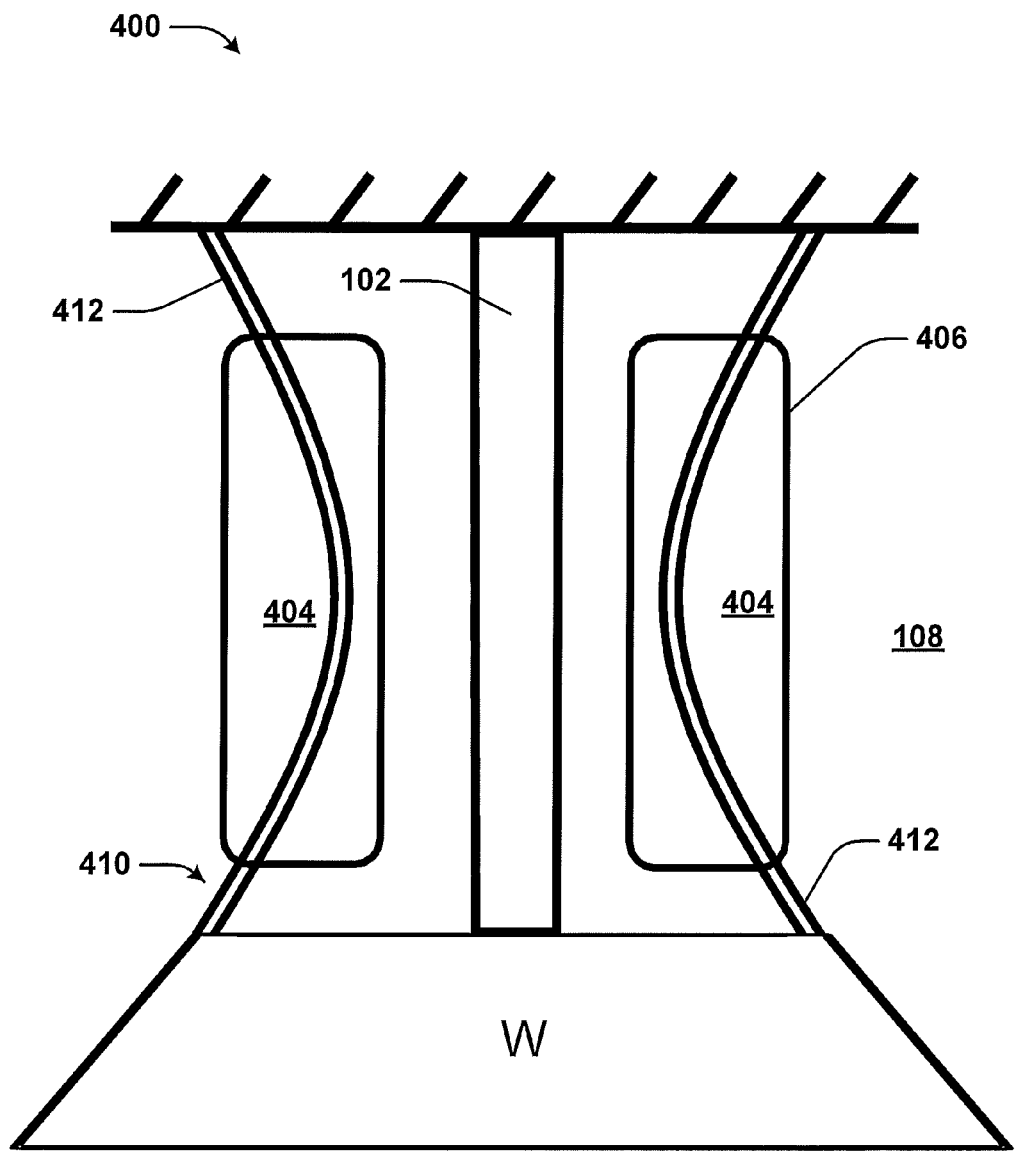
FIG. 4A illustrates a cross section of another actuator assembly including moving masses of phase change material prior to actuation, according to an embodiment of the present disclosure.

FIG. 4A shows an assembly 400 having an SMA actuator element 102 and a PCM 404. The PCM 404 of this embodiment may have the characteristics of the PCMB 104, 204 described above in connection with FIG. 1 and FIG. 2. For example, in some embodiments, the PCM 404 is a thermal composite (e.g., PCM/Non-PCM matrix), and in some embodiments is at least partially covered by a sheath 406, which may be the same or similar to the sheath 106 described above in connection with the assembly 100 illustrated in FIG. 1.

The assembly 400 is configured such that the PCM 404 and SMA actuator element 102 autonomously and selectively engage and disengage with each other as the assembly 400 cycles between actuated and non-actuated states. For this, in some embodiments the assembly 400 further includes a drive mechanism 410. The drive mechanism 410 is associated with the PCM 404 and operable to cause displacement of the PCM 400 to a point of contact with the SMA actuator element 102. The drive mechanism 410 is preferably configured to cause such contact without applying excessive stress loads to the SMA actuator element 102. It is contemplated that the PCM 404 may be integral to the drive mechanism 410 or connected to it.

In one embodiment, the drive mechanism 410 includes one or more bowed structures 412, such as bowed springs, or other types of springs. In one embodiment, the drive mechanism 410 is configured and arranged in the assembly 400 to be driven by the SMA actuator element 102, itself. Namely, when the SMA actuator element 102 moves, in actuating and de-actuating to do work, the mechanism 410 is moved in a corresponding fashion due to its connection to the actuator element 102.

Figure 4B:
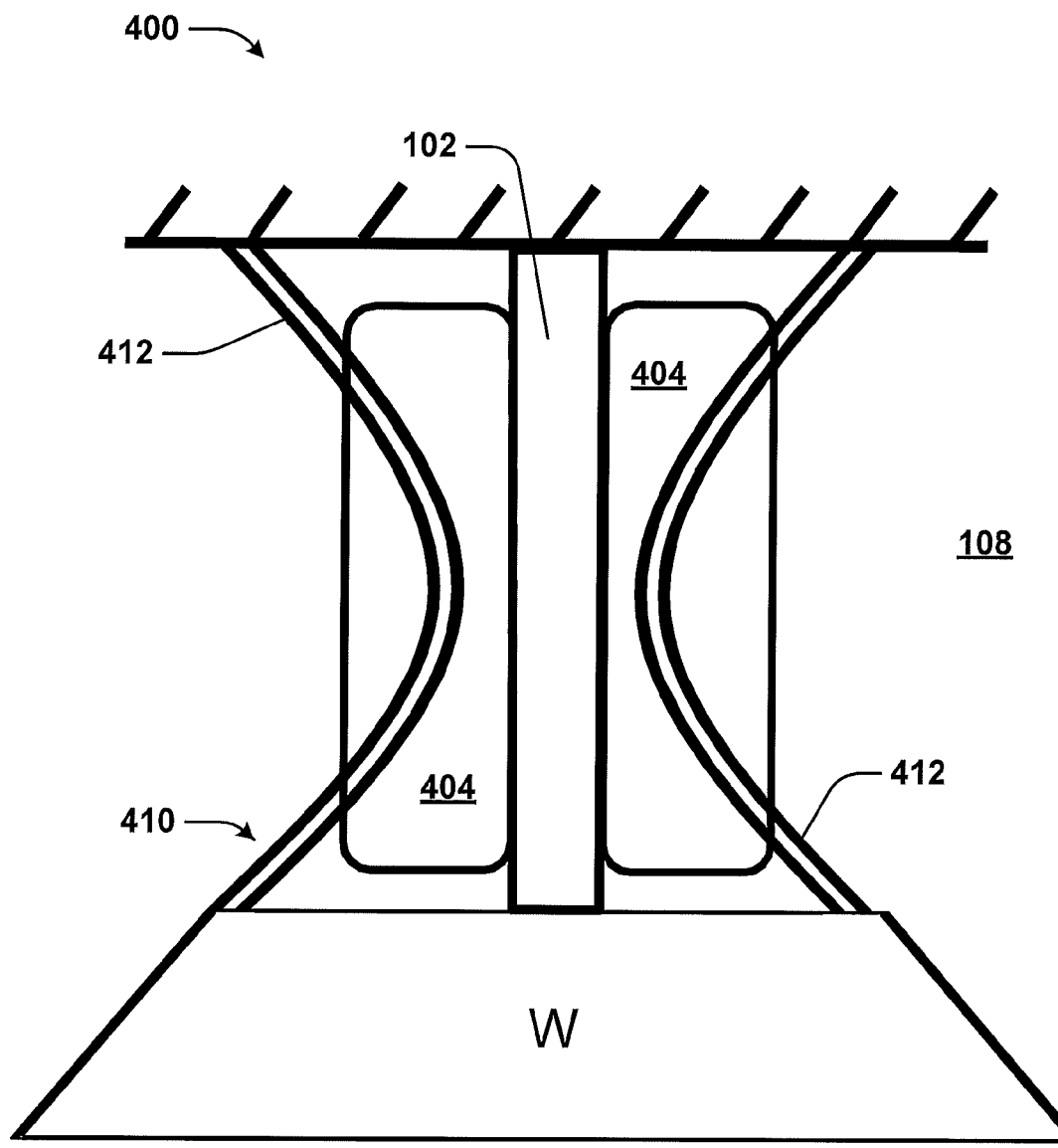
FIG. 4B illustrates the cross section of the actuator assembly of FIG. 4A after actuation.

For instance, when the SMA actuator element 102 is actuated from its non-actuated state, shown in FIG. 4A, to its actuated state shown in FIG. 4B, the drive mechanism 410 is moved from its initial position shown in FIG. 4A to the resulting position shown in FIG. 4B.

As shown in FIGS. 4A and 4B, the drive mechanism 410 is configured and arranged in the actuator assembly 400 so that the PCM 404 is moved toward engagement with the SMA actuator element 102 as the actuator element 102 is actuated. This embodiment is used to provide beneficial thermal transfer between the SMA actuator element 102 and the PCM 404 at and/or after the point of actuation. For instance, as described further in the second case examples below, the assembly 400 could be used to decrease de-activation time by using the PCM 404 as a heat sink.

The PCM 404 is caused to be at a temperature that is lower than the actuation temperature of the SMA actuator element 102. When the PCM 404 contacts the SMA actuator element 102, energy is transferred from the SMA actuator element 102 to the PCM 404, and a rate of cooling of the actuator element 102 is increased thereby. The rate of cooling is higher when the PCM mass 404 touches the SMA wire than when the SMA wire is losing heat to the ambient environment by convection and/or radiation because solid-solid heat transfer coefficients are greater than natural or forced solid-fluid heat transfer coefficients when good thermal contact is maintained at the solid-solid interface. The PCM element 404 allows a significant amount of heat to be removed from the wire by providing a low temperature sink with a high heat absorption capacity.

Upon de-actuation, the PCM 404 are moved away from contact with the SMA actuator element 102 so as to not increase actuation time by keeping temperature of the element 102 down.

In some embodiments, when in the actuated state shown in FIG. 4B, the assembly 400 is arranged so that the PCM 404 is pressed into contact with the SMA actuator element 102 so that a contact area is maximized and/or good thermal contact is achieved whereby heat transfer between the two is maximized. For example, the drive mechanism 410, the PCM 404, and the actuator element 102 may be arranged so that when the actuator element 102 is in its actuated state, the drive mechanism 410 exerts a bias force causing the PCM 404 to press against the SMA actuator element 102.

In some embodiments, the drive mechanism 410 provides a biasing force toward one or both of the non-actuated position shown in FIG. 4A and the actuated position shown in FIG. 4B. In this way, the drive mechanism 410 assists the SMA actuator element 102 in transitioning from its actuated state to non-actuated state or the non-actuated state to the actuated state, respectively. In this way the drive mechanism 410 can limit the amount of force that the actuator element 102 needs to generate to actuate or de-actuate. Other benefits can include longer life of the actuator element, increased load-moving ability of the assembly 400, and faster actuation and/or de-actuation times.

VII. PCM BATH

Figure 5A:
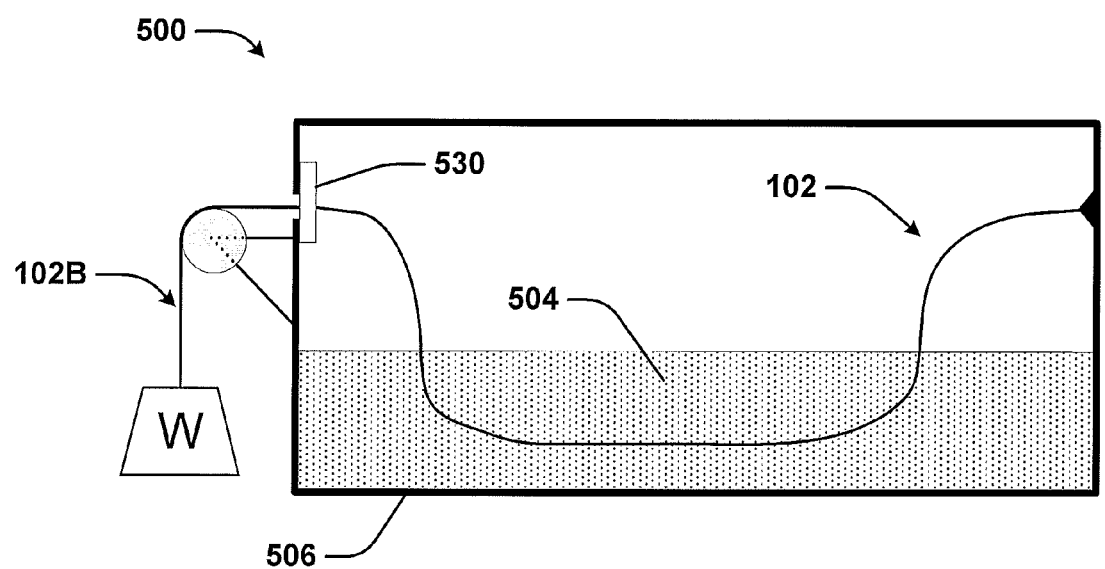
FIG. 5A illustrates a cross section of an actuator assembly including a phase change material bath, prior to actuation, according to an embodiment of the present disclosure.

FIGS. 5A/B illustrate an assembly 500 according to another embodiment configured so that, as with the embodiments of FIGS. 3A/B and FIGS. 4A/B, a thermal actuating element 102 selectively contacts a PCM 504 during the actuation cycle. In this embodiment, the PCM 504 is in the form of a bath or reservoir, held by a bath casing or enclosure 506.

It will be appreciated that the assembly 500 of FIGS. 5A/B relates more closely to the assembly 300 of FIGS. 3A/B, in that each is configured so that the thermal actuating element 102 (e.g., SMA wire) is moved out of thermal contact with the PCM 304/504 when the actuating element 102 actuates, and back into contact with the PCM 304/504 when the actuating element de-actuates. In one contemplated embodiment, the PCM bath 504 is a thermal composite including non-PCM material, such as beads of non-PCM material, to affect thermal and/or dynamic characteristics of the bath 504.

As described above, some thermally actuated SMA materials show a significant two-way shape memory effect i.e. not only do they contract on heating above a characteristic temperature ($A_s$), but they also spontaneously elongate on cooling below a lower characteristic temperature ($M_s$). Thus, the material seems to 'memorize,' not just its high temperature configuration, but also its configurations at one or more lower temperatures, and especially its length at the reference ambient temperature ($T_{ref}$).

For some embodiments in which the actuator element 102 is used to do work against an external load W (e.g., lifting a dead weight as shown in FIGS. 5A/B), the assembly 500 includes a hard stop 530. While the assembly 500 includes various types of hard stops in various embodiments, in the embodiment of FIGS. 5A/B the hard stop 530 connected to the actuator element 102. The hard stop in this embodiment is configured and connected to the actuator element 102 so that it contacts the bath enclosure 506 (see FIG. 5B) or other structure to impede movement of the stop 530, and thereby additional pull on the actuator element 102. In this and other embodiments including a hard stop 530, the stop 530 can be used to prevent the external load W from straining the actuator 102 beyond a specified strain limit when it is in its softer Martensite phase. Whether the assembly 500 includes a stop 530, the assembly 500 may include between the actuator element 102 and the load W, such as a length of material that may include actuator material or non-actuator material.

In operation, the actuator element 102, when de-activated, goes slack, and thereby is partially or wholly immersed into the PCM bath 504, being partially or wholly molten, as shown in FIG. 5A. In some embodiments, the PCM bath 504 stores heat from a heat source, such as those described above regarding other embodiments (e.g., trickle current heat from a resistive heaters, waste heat from automobile exhaust or coolant, etc.). In these embodiments, the PCM bath 504 can be kept at a preheat temperature, $T_{preheat}$ between $T_{ref}$ and $M_{f\_s_0}$.

Pre-heating the actuator element 102 helps reduce the actuation time by reducing the temperature range through which the actuation stimulus (e.g., electric current for resistively-heated SMAs) needs to heat the actuator element 102 for actuation. When the actuator element 102 actuates, the phase-change induced contraction initially results in a take-up of the slack in the actuator element 102, as shown from FIG. 5A to FIG. 5B. After the slack has been taken up, the actuator element 102 does work against the external load W, such as by lifting a dead weight load.

In some embodiments, the assembly 500 is configured so that, once the slack is fully taken up, the actuator element 102 is no longer in thermal contact with the PCM bath 504. In this way, the actuator element 102, being heated, does not supply unwanted heat (e.g., overheating) the PCM bath 504. Also, the actuator element 102 does not require additional stimulus, such as extra current, when it is in its actuated state to make up for loss of heat to the PCM in the bath 504.

Figure 5B:
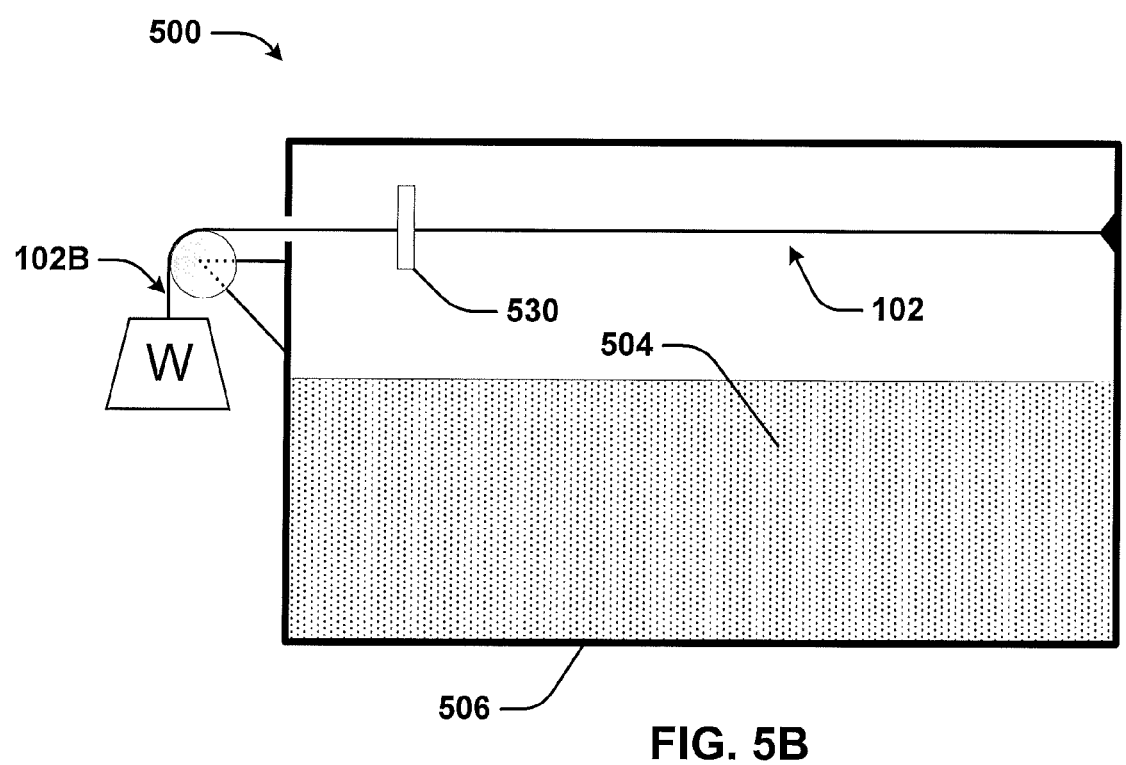
FIG. 5B illustrates the cross section of the actuator assembly of FIG. 5A, after actuation.

When the SMA is de-actuated, by letting it cool to below a characteristic temperature, it undergoes a reverse phase transformation which results in a lower-modulus phase, going from the arrangement shown in FIG. 5B toward that in FIG. 5A. For embodiments in which the load W includes deadweight or other load pulling on the actuator element 102, the load W stretches the actuator element 102 until the hard stop 530 comes into effect to limit the strain that the external load can induce on the actuator element 102. Further cooling, after the hard stop 530 has come into effect, causes the wire to slacken until it reaches its initial configuration at the reference temperature $T\_ref$, shown in FIG. 5A. This completes an actuation cycle.

In some embodiments, seals and non-SMA connector elements (not shown) are used, such as to avoid inadvertent transport of the PCM out of the PCM reservoir due to repeated contraction and elongation of the actuator element 102. Non-SMA connecter elements can also help restrict the actuator element 102 that comes in contact with the PCM bath to remain within the casing 506 thereby avoiding the transport of the PCM material out of the casing via entrainment, etc.

Operation and advantages of the assembly 500 of FIGS. 5A/B are otherwise the same as those described above in connection with the assembly 300 of FIG. 3A/B.

VIII. HEAT TRANSFER CASES

As described above, the PCM can draw heat from or releases heat to the SMA actuator element 102 depending on the relative temperatures of the PCM and SMA actuator element. Below are described example cases in which the PCM has various phase-change temperatures (e.g., melting point) with respect to the actuation temperature of the SMA actuator element 102. The selection of PCM affects what part or parts of the actuation cycle are improved, sometimes at the expense of slightly lower performance on a complementary part of the cycle.

For example, an arrangement in which the selected PCM greatly reduces the time that it takes an SMA actuator element 102 to de-activate may have no affect on, or even slightly increase, the actuation time. Similarly, an arrangement in which the selected PCM reduces the time that it takes an SMA actuator element 102 to activate may have no affect on or increase de-actuation time. In some arrangements, the selected PCM can facilitate decreases in both actuation time and de-actuation time, but these decreases will generally not be as large as those achievable in embodiments of the present disclosure in which the assembly is arranged to achieve much lower times of actuation or de-actuation.

A. First Heat Transfer Case

In a first exemplary case, to decrease actuating time, the PCM is exposed to a pre-heating source, such as an external fluid, and the PCM is selected to have a phase-change temperature that is relatively close to the reference ambient temperature ($T_{ref}$). In one embodiment, the range can be represented as: $T_{ref} \leq MP < M_{f\_s_{min}}$, where MP (melting point) is the temperature at which the PCM undergoes the phase transformation that is responsible for its heat storage/release function, $M_{f\_s_{min}}$ is the temperature (Martensite finish) at which the Austenite to thermal Martensite transformation is completed by the SMA and it reverts back to its initial stress level of $s_{min}$. The closer the MP is to $T_{ref}$, the closer will be the response of the system at low ambient temperatures ($T\_0\_{min} < T_{ref}$, where $T\_0$ is the ambient temperature) to its response at $T_{ref}$. This leads to a system whose thermal response is less sensitive to variations in the ambient temperature. The closer is the MP to $M_{f\_s_{min}}$, the greater is the reduction in the actuation time as compared to the baseline system without the PCM, but this comes at the cost of a higher de-actuation time.

In at least some embodiments, it is preferred that the pre-heat temperature to be less than $M_{f\_s_{min}}$ to ensure complete transformation back to Martensite on cooling.

As described further herein, the external fluid could be a trickle current of by-product heat from, for example, an engine or heating/cooling system external to the actuator assembly. By being exposed to the external fluid, the PCM arrives at and can at least for a period of time remain fully or partially in its liquid phase, and keeps the SMA actuator element 102 at or above the MP of the PCM prior to actuation of the SMA actuator element 102.

As provided, while solid-to-solid and liquid-to-gas phase transformations can also be used as PCMs capable of heat storage/release, most common PCM applications use the solid-to-liquid phase change. As such, for ease of explanation, the terminology for the solid-to-liquid PCMs used herein includes solid phase, liquid phase, melting point, melting and freezing instead of pre-transformation phase, post-transformation phase, phase transformation temperature, forward transformation, and reverse transformation, respectively. It should be understood, however, that the present disclosure applies to the other types of PCMs.

When the ambient temperature ($T\_0$) is lower than the MP of the PCM, the SMA actuator element 102, being pre-heated by the PCM, is closer to its actuation temperature prior to actuation than if the actuator were at $T\_0$. Accordingly, when the actuation stimulus (e.g., electric current to resistively heat the SMA) is provided to the SMA actuator element 102, the temperature of the SMA actuator element 102 only needs to be increased from the pre-heated temperature to its actuation temperature, and not from a lower ambient temperature, thereby reducing actuation time if the stimulus level is unchanged or reducing the required stimulus level to effect the actuation while leaving the actuation time unchanged.

In some embodiments, the first case is implemented with an assembly such as the assemblies 100 or 200 described above in connection with FIGS. 1 and 2. In other embodiments, the first case is implemented with an assembly 300, as described with respect to FIGS. 3A/B, or FIGS. 5A/B.

As described above with respect to the assembly 300 of FIGS. 3A/B, for example, a drive mechanism 320 is configured and arranged in the actuator assembly 300 so that the PCM reservoir 304 is moved away from direct thermal contact with the SMA actuator element 102 as the actuator element 102 is actuated. The PCM reservoir 304 may comprise a hollow copper block with the PCM filling most of its hollow core. This embodiment is used to provide beneficial thermal transfer between the SMA actuator element 102 and the PCM reservoir 304 as long as the reservoir temperature is greater than that of the SMA. The PCM 304 is caused to be at a temperature that is higher than the temperature of the ambient environment by receiving heat from an external source (not shown) and storing it. In some implementations, the MP of the PCM lies between $T_{ref}$ and $M_{f\_S_{min}}$. It will be appreciated that similar operation and benefits can be accomplished using the assembly 500 of FIGS. 5A/B.

In some embodiments, it is important for the PCM to be in the molten state when it is transferring heat to the SMA actuator in order to use the higher energy storage capacity offered by the PCMs. In this way, contact with the PCM reservoir serves to pre-heat the SMA thereby decreasing the heating current needed to actuate it in a given time interval or the time needed to actuate it for a given actuation current. An advantage of using the assembly shown in FIGS. 3A/B and FIGS. 5A/B over those in FIGS. 1 and 2 is that with the former, the PCM does not stay in thermal contact with the SMA after it actuates. Hence, the PCM does not get heated by the fully actuated SMA which is at a temperature higher than $A_f$, and hence, higher than MP of the PCM. This mitigates the upward shift in the temperature of the PCM over multiple consecutive cycles. This becomes important if the SMA is required to stay actuated for a significant part of its duty cycle. Moreover, when the actuator de-actuates, the PCM reservoir does not come back into thermal contact with the SMA until the SMA has recovered most (or all) of its original length. Thus, the increase in cooling time due to the presence of the pre-heating PCM reservoir is much less for the assemblies shown in FIGS. 3A/B and FIGS. 5A/B than in FIGS. 1-2. Accordingly, although the assemblies shown in FIGS. 3A/B and FIGS. 5A/B are more complex than those in FIGS. 1-2, they provide better control over the thermal response of the SMA actuator.

B. Second Heat Transfer Case

In the second case, the PCM is used as a heat absorbing element, or heat sink, to decrease de-actuation, or cooling time of the SMA actuator element 102 following activation. Reducing the de-actuation time has benefits including reducing the overall cycle time—the time for an actuator to actuate, and de-actuate so as to be ready for a subsequent actuation. Because cycle times in most actuator arrangements are dominated by the cooling part of the cycle, which in some cases takes between about 25-60 seconds and/or taking as much about 90% of the cycle time. The PCM of the embodiments described above are operable to accelerate the rate of cooling by at least about 25%, and most preferably by at least about 80% in comparison to conventional systems in which the SMA actuator element 102 is only exposed to an ambient environment.

For this case, the PCM is selected to have a phase-change temperature that is a superset of the range indicated above for the PCM chosen for the First Heat Transfer Case. Specifically, a suggested range is $MP < Mf\_s_{min}$. PCMB with MPs lower than $T_{ref}$ may be used advantageously if provision is made to cool them to below their MP by some external means esp. when they are not being used to cool the SMA actuators.

As described above with respect to the assembly 400 of FIGS. 4A and 4B, for example, the assembly 400 includes an SMA actuator element 102 and a PCM reservoir 404 arranged so that the PCM reservoir 404 and SMA actuator element 102 autonomously and selectively engage and disengage with each other as the assembly 400 cycles between actuated and non-actuated states. For this, in some embodiments the assembly 400 further includes a drive mechanism 410.

The PCM reservoir 404 may comprise a hollow copper block with the PCM filling most of its hollow core. When the SMA actuator is in its de-actuated state, the PCM reservoir is not in direct thermal contact with the SMA. The drive mechanism 410 is configured and arranged in the actuator assembly 400 so that the PCM reservoir 404 is moved into direct thermal contact with the SMA actuator element 102 as the actuator element 102 is actuated.

When the PCM reservoir 404 is brought into direct thermal contact with the SMA actuator, it starts to cool the SMA actuator by drawing heat away quickly from the actuator. The reservoir achieves this by being at a temperature lower than the actuation temperature of the SMA and by exploiting the fact that solid-to-solid heat transfer coefficients (e.g., SMA wire to Copper block) are higher than solid-to-air gas transfer coefficients (e.g., SMA wire to air), thereby resulting in a higher heat transfer rate, even when the temperature differential is the lower than when the SMA wire is directly losing heat to air.

In certain embodiments of the present disclosure, solid moving masses are replaced with by hollow solid masses filled with PCM, which considerably increases the heat absorption capacity per unit mass due to the high heat storage capacity associated with phase change in PCMs. Upon de-actuation, the PCM 404 are moved away from contact with the SMA actuator element 102, so as not to increase actuation time by keeping temperature of the element 102 down.

C. Third Heat Transfer Case

In a third case, the PCM is used as a thermal fuse to reduce the likelihood of the SMA actuator element 102 overheating. As an example, the SMA actuator element 102 has an actuation temperature ($A_{f\_S_{max}}$) of about 75° C., and can tolerate temperatures ($T_{max}$) as high as about 100° C. before failing, such as by loss/deterioration in shape memory behavior, fracture, etc.

One way to reduce actuation time is to apply more heat to the SMA actuator element 102 without exceeding $T_{max}$. For example, the SMA actuator element 102 can be only momentarily introduced to a stimulus (e.g., heating current in a resistively heated SMA actuator) of magnitude that, if applied continuously, can achieve a steady state temperature in the wire that is above its actuation temperature. This high magnitude of the stimulus is applied for a brief period so that the SMA actuator element 102 more quickly reaches the actuation temperature. Once the SMA wire temperature is sufficiently near its actuation temperature, the stimulus magnitude is reduced to that required to maintain the actuation temperature in the wire. In such cases, it is useful to protect the SMA by preventing its temperature from exceeding $T_{max}$ in the event that the modulation of the stimulus as described above is not sufficient to keep the SMA temperature within the prescribed limits. This can be achieved by keeping the SMA in thermal contact with a PCM whose MP falls, for example, in a range of: $A_{f\_s_{max}} < MP < T_{max}$.

During normal operation, i.e., when the temperature of the SMA on full actuation stays at or near $A_{f\_s_{max}}$, the PCM remains in its frozen state. If the protective PCM material is coated on the SMA actuators as shown in FIGS. 1 and 2, for example, the heat necessary to actuate the SMA is advantageously provided by resistive heating. In this case, the resistively generated heat in the SMA wire is partially conducted to the PCM coating which leads to some sensible heating of the PCM.

As long as the SMA actuator temperature stays below the MP of the PCM, the PCM absorbs relatively small amounts of heat. However, if the SMA wire temperature equals or exceeds the MP of the PCM, the PCM absorbs relatively large amounts of heat at a generally constant temperature, which is the MP of the PCM. Thus, the PCM serves as a thermal fuse that can absorb relatively large quantities of heat without letting the SMA temperature exceed the MP of the PCM, which is chosen to be less than $T_{max}$.

When the SMA actuator element temperature falls below MP, the PCM refreezes. The PCM coating can provide protection against a single thermal overload event (e.g., FIG. 1, where the coating melts away after it is used) or multiple such events (e.g., FIG. 2, where the sheath 206 contains the molten PCM and prevents it from leaking out). Typically, PCMs for thermal management applications like the ones described here tend to have high thermal diffusivities. Hence, for thick coatings/sheaths made of PCM, the coating/sheath can enhance the heat loss from the SMA element by increasing the effective heat transfer area. This reduces the cooling times albeit at the penalty of increasing the heating times. However, resistive heating is nearly adiabatic, hence the increase in heating times due to the increase in the effective heat transfer area is negligible while the decrease in cooling times can be significant, thereby enabling PCM coatings/sheaths to yield significant reduction in cycle times while providing thermal overload protection.

Accordingly, benefits of the present disclosure include, in addition to the ability to reduce cooling times by effectively increasing the heat transfer area via thermally conductive coatings, and due to their high thermal diffusivities, reducing cycle times by using the PCM coatings as a thermal fuse. In some embodiments, PCMs need high thermal diffusivities to ensure that any absorbed heat is spread throughout the PCM body, and not localized to some areas. In this way, heat absorption per unit mass of the PCM is maximized.

In some embodiments, the third case is implemented with an assembly such as the assemblies 100 or 200 described above in connection with FIGS. 1 and 2. In other embodiments, the third case is implemented with an assembly 400 like that described with respect to FIGS. 4A and 4B.

IX. ADDITIONAL USES

It is contemplated that phase change materials can be used in place of other heat control elements, such as heat sinks, to achieve the various benefits of controlled heat transfer described herein above. For example, regarding U.S. patent application Ser. No. 12/792,120 (the '120 application), a phase change material may be used in place of the thermal elements 14a,b described in connection with FIGS. 1a, 1b, and 1c, of that application. As another example, a phase change material may be used in place of the thermal element 14 described in connection with FIG. 2 and each of FIGS. 4-7 of the 120 application. As a further example, a phase change material may be used in place of the thermal element 38 described in connection with FIG. 8 of the '120 application. As provided above, the present application claims priority to and continues-in-part from the '120 application.

X. CONCLUSION

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A thermally-activated material assembly, transformable between an actuated condition and a non-actuated condition, comprising:
    an actuator element having actuator material defined by an actuation temperature and a reset temperature, wherein the actuator material:
        in response to being heated to or above the actuation temperature, causes the actuator element to actuate from a non-actuated shape, wherein the assembly is in the non-actuated condition, to an actuated shape, transforming the assembly to the actuated condition; and
        in response to cooling to or below the reset temperature, causes the actuator element to actuate from the actuated shape back to the non-actuated shape;
    a mechanism connected to the actuator element;
    a phase-change material (PCM) component associated with the mechanism, the PCM component being defined by a phase-change temperature and causing the PCM component to transition from a first state to a second state in response to being heated to or above the phase-change temperature; and
    a sheath surrounding at least a portion of the PCM component so as to contain material of the PCM component when the PCM component is in the second state;
    wherein the mechanism is configured and arranged in the assembly to:
        cause the PCM component to directly engage the actuator element when the assembly is in the non-actuated condition and to be disengaged from the actuator element when the assembly is in the actuated condition; or
        cause the PCM component to directly engage the actuator element when the assembly is in the actuated condition and to be disengaged from the actuator element when the assembly in the non-actuated condition.

2. The thermally-activated material assembly of claim 1, wherein:
    the mechanism is configured to cause the PCM component to directly engage the actuator element when the assembly is in the non-actuated condition and to be disengaged from the actuator element when the assembly is in the actuated condition; and
    the PCM component is configured so that the phase-change temperature is lower than the actuation temperature of the actuator element and higher than an ambient temperature to which the assembly is expected to be exposed during operation of the assembly.

3. The thermally-activated assembly of claim 1, wherein;
the mechanism is configured to cause the PCM component to directly engage the actuator element when the assembly is in the actuated condition and to be disengaged from the actuator element when the assembly is in the non-actuated condition; and
the phase-change temperature of the PCM component is lower than the actuation temperature of the actuator element.

4. The thermally-activated material assembly of claim 1, wherein the PCM component is connected to the mechanism.

5. The thermally-activated material assembly of claim 1, wherein the PCM component is an integral part of the mechanism.

6. The thermally-activated material assembly of claim 1, wherein the PCM component is a part of a PCM thermal composite including a non-PCM component forming the PCM thermal composite with PCM component, the non-PCM component having a higher conductivity than the PCM component, thereby promoting transfer of heat introduced to a proximal region of the PCM composite to a distal region of the PCM composite during operation of the assembly.

7. The thermally-activated material assembly of claim 1, wherein the assembly is designed to effect desired thermal management characteristics when the PCM component is exposed to a heat source being at a temperature that is higher than an ambient temperature to which the assembly is expected to be exposed to during operation of the assembly.

8. The thermally-activated material assembly of claim 1, wherein the mechanism biases the assembly toward one of the actuated condition and the non-actuated condition.

9. The thermally-activated material assembly of claim 1, wherein the PCM component includes a shape-memory alloy (SMA).

10. The thermally-activated material assembly of claim 1, wherein the PCM component includes a shape-memory polymer (SMP).

11. A thermally-activated material assembly, transformable between an actuated condition and a non-actuated condition, comprising:
an actuator element having actuator material defined by an actuation temperature and a reset temperature, wherein the actuator material:
in response to being heated to or above the actuation temperature, causes the actuator element to actuate from a non-actuated shape, wherein the assembly is in the non-actuated condition, to an actuated shape transforming the assembly to the actuated condition in response to being heated to the actuation temperature; and
in response to cooling to or below the reset temperature, causes the actuator element to actuate from the actuated shape back to the non-actuated shape; and
a phase-change material (PCM) bath arranged in the assembly adjacent the actuator element so that the actuator element is selectively moved out of, into, and back out of thermal contact with the PCM bath as the actuator element transitions from the actuated condition, to the non-actuated condition, and back to the actuated condition, respectively, wherein:
the PCM bath is defined by a phase-change temperature;
the PCM bath transitions from a first state to a second state in response to being heated to or above the phase-change temperature; and
the PCM bath is configured so that the phase-change temperature is lower than the actuation temperature of the actuator element.

12. The thermally-activated material assembly of claim 11, further comprising an enclosure surrounding at least a portion of the PCM bath.

13. The thermally-activated material assembly of claim 11, wherein the PCM bath includes a PCM component and a non-PCM component forming a PCM thermal composite with the PCM component, the non-PCM component having a higher conductivity than the PCM component, thereby promoting transfer of heat introduced to the PCM bath in operation of the assembly.

14. The thermally-activated material assembly of claim 11, wherein the PCM bath includes a material selected from a group of materials consisting of a shape-memory alloy (SMA) and a shape-memory polymer (SMP).

15. The thermally-activated material assembly of claim 11, further including a stop configured and arranged in the assembly to limit strain exerted on the actuator element.

16. A thermally-activated material assembly, transformable between an actuated condition and a non-actuated condition, comprising:
a thermally-sensitive actuator element having thermally-sensitive actuator material defined by an actuation temperature and a reset temperature, wherein:
in response to being heated to the actuation temperature, the thermally-sensitive actuator material causes the thermally-sensitive actuator element to actuate from a non actuated shape, wherein the assembly is in the non-actuated condition, to an actuated shape, transforming the assembly to the actuated condition; and
in response to being cooled to the reset temperature, the actuator material causes the thermally-sensitive actuator element to actuate from the actuated shape back to the non-actuated shape; and
a phase-change material (PCM) composite connected to the thermally-sensitive actuator element, the PCM composite including:
a PCM component defined by a phase-change temperature and causing the PCM component to transition from a first state to a second state in response to being heated to the phase-change temperature; and
a non-PCM component distributed with the PCM component, the non-PCM component having a higher conductivity than the PCM component, thereby promoting transfer of heat introduced to a proximal region of the PCM composite to a distal region of the PCM composite;
wherein the PCM component is configured so that the phase-change temperature is lower than the actuation temperature of the thermally-sensitive actuator element and higher than an ambient temperature to which the assembly is expected to be exposed during operation of the assembly.

17. The thermally-activated material assembly of claim 16, further comprising a sheath surrounding at least a portion of the PCM composite so as to contain material of the PCM component when the PCM component is in the second state.

18. The thermally-activated material assembly of claim 16, wherein the assembly is designed to effect desired thermal management characteristics when the PCM composite is exposed to a heat source being at a temperature that is higher than an ambient temperature to which the assembly is expected to be exposed to during operation of the assembly.

19. A thermally-activated material assembly, transformable between an actuated condition and a non-actuated condition, comprising:

a thermally-sensitive actuator element having thermally-sensitive actuator material defined by an actuation temperature and a reset temperature, wherein:
  in response to being heated to the actuation temperature, the thermally-sensitive actuator material causes the thermally-sensitive actuator element to actuate from a non-actuated shape, wherein the assembly is in the non-actuated condition, to an actuated shape, transforming the assembly to the actuated condition; and
  in response to being cooled to the reset temperature, the actuator material causes the thermally-sensitive actuator element to actuate from the actuated shape back to the non-actuated shape;
a phase-change material (PCM) composite connected to the thermally-sensitive actuator element, the PCM composite including:
  a PCM component defined by a phase-change temperature and causing the PCM component to transition from a first state to a second state in response to being heated to the phase-change temperature; and
  a non-PCM component distributed with the PCM component, the non-PCM, component having a higher conductivity than the PCM component, thereby promoting transfer of heat introduced to a proximal region of the PCM component to a distal region of the PCM component; and
  a sheath surrounding at least a portion of the PCM composite so as to contain material of the PCM component when the PCM component is in the second state.

20. The thermally-activated material assembly of claim 19, wherein the PCM component is configured so that the phase-change temperature is lower than the actuation temperature of the thermally-sensitive actuator element.

21. The thermally-activated material assembly of claim 19, wherein the PCM component is configured so that the phase-change temperature is higher than an ambient temperature to which the assembly is expected to be exposed during operation of the assembly.

22. The thermally-activated material assembly of claim 19, wherein the assembly is designed to effect desired thermal management characteristics when the PCM composite is exposed to a heat source being at a temperature that is higher than an ambient temperature to which the assembly is expected to be exposed to during operation of the assembly.

* * * * *